United States Patent
Wei

(10) Patent No.: US 11,392,343 B2
(45) Date of Patent: Jul. 19, 2022

(54) METHOD AND APPARATUS FOR PROCESSING MULTI-PARTY AUDIO, AND STORAGE MEDIUM

(71) Applicant: BEIJING DAJIA INTERNET INFORMATION TECHNOLOGY CO., LTD., Beijing (CN)

(72) Inventor: Chunxiang Wei, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/108,014

(22) Filed: Dec. 1, 2020

(65) Prior Publication Data

US 2021/0357173 A1 Nov. 18, 2021

(30) Foreign Application Priority Data

May 13, 2020 (CN) .......................... 202010404086.X

(51) Int. Cl.
*G06F 3/16* (2006.01)
*G10L 25/51* (2013.01)
*G10L 25/78* (2013.01)

(52) U.S. Cl.
CPC .............. *G06F 3/165* (2013.01); *G10L 25/51* (2013.01); *G10L 25/78* (2013.01)

(58) Field of Classification Search
None
See application file for complete search history.

(56) References Cited

U.S. PATENT DOCUMENTS

| 7,007,098 B1* | 2/2006 | Smyth | H04L 29/06027 348/E7.084 |
| 8,653,349 B1* | 2/2014 | White | G10H 1/0025 84/600 |
| 2004/0199277 A1* | 10/2004 | Bianchi | G11B 20/1816 700/94 |
| 2008/0190271 A1* | 8/2008 | Taub | G10H 1/0058 84/645 |
| 2011/0126103 A1* | 5/2011 | Cohen | G11B 27/34 715/716 |

(Continued)

FOREIGN PATENT DOCUMENTS

| CN | 105208039 A | 12/2015 |
| CN | 105788609 A | 7/2016 |
| CN | 110176221 A | 8/2019 |

(Continued)

OTHER PUBLICATIONS

The State Intellectual Property Office of People's Republic of China, OA for CN application 202010404086.X With English translation, dated Nov. 16, 2021, 12 pages.

*Primary Examiner* — Hemant S Patel
(74) *Attorney, Agent, or Firm* — Timothy W. Menasco, Esq.; Harter Secrest & Emery LLP

(57) ABSTRACT

The disclosure relates to solutions for processing multi-party audio. A first client obtains a piece of music from a virtual space, in which the virtual space is created by the first client and configured to support communication among the first client and at least one second client entering the virtual space, the music includes a first audio. The first client obtains a second audio matching the first audio from at least one client in the virtual space. The first client plays the first audio and the second audio.

16 Claims, 5 Drawing Sheets

(56) References Cited

U.S. PATENT DOCUMENTS

2013/0031220 A1\* 1/2013 Moncavage ........... G10H 1/361
709/219

FOREIGN PATENT DOCUMENTS

| CN | 110267081 A | 9/2019 |
| CN | 110718239 A | 1/2020 |
| CN | 110910860 A | 3/2020 |
| JP | 2020017868 A | 1/2020 |

\* cited by examiner

METHOD AND APPARATUS FOR PROCESSING MULTI-PARTY AUDIO, AND STORAGE MEDIUM

CROSS-REFERENCE TO RELATED APPLICATION

The present application is based on and claim priority to Chinese Patent Application No. 202010404086.X, filed with the China National Intellectual Property Administration on Mar. 13, 2020, the disclosures of which are herein incorporated by reference in its entirety.

FIELD

The disclosure relates to network technology, and in particular to a method and apparatus for processing multi-party audio, and a non-transitory computer-readable storage medium.

BACKGROUND

With the development of information technology and the continuous improvement of network bandwidth, online video viewing has become more and more popular. Existing video websites and video applications can not only provide users with video playlists, the users can select the videos they want to watch from the video playlists, and they can also play live videos for the users. That is, during a live broadcast of a certain anchor, the user chooses to enter the live broadcast room of the anchor, and the live video stream of the anchor can be played on the user client.

When users are watching the live video, if they are interested in a certain segment of the plot in the live video, they can edit it; they can send virtual gifts to other viewers in the live room; they can also make a voice call with the live microphone.

SUMMARY

The disclosure provides a method and apparatus for processing multi-party audio. The technical solutions of the disclosure are described as follows.

Embodiments of the disclosure provide a method for processing multi-party audio. The method is applied to a first client. The method includes: obtaining a piece of music from a virtual space, in which the virtual space is created by the first client and configured to support communication among the first client and at least one second client entering the virtual space, the music includes a first audio; obtaining a second audio matching the first audio from at least one client in the virtual space; and playing the first audio and the second audio.

Embodiments of the disclosure provide a method for processing multi-party audio. The method is applied to a second client. The method includes: obtaining a piece of music from a virtual space, in which the virtual space is created by a first client and configured to support communication among the first client, the second client and other clients entering the virtual space, the music includes a first audio; collecting a second audio matching the first audio; providing the second audio to the first client.

Embodiments of the disclosure provide an apparatus for processing multi-party audio. The apparatus is applied to a first client. The apparatus includes: one or more processors; a memory coupled to the one or more processors, and a plurality of instructions stored in the memory. When the plurality of instructions are executed by the one or more processors, the one or more processors are caused to perform acts of: obtaining a piece of music from a virtual space, in which the virtual space is created by the first client and configured to support communication among the first client and at least one second client entering the virtual space, the music includes a first audio; obtaining a second audio matching the first audio from at least one client in the virtual space; and playing the first audio and the second audio.

Embodiments of the disclosure provide a non-transitory computer-readable storage medium. The storage medium is applied to a first client. When an instruction stored in the storage medium is executed by a processor in an electronic device, the processor is caused to perform acts including: obtaining a piece of music from a virtual space, in which the virtual space is created by the first client and configured to support communication among the first client and at least one second client entering the virtual space, the music includes a first audio; obtaining a second audio matching the first audio from at least one client in the virtual space; and playing the first audio and the second audio.

It should be understood that the above general description and the following detailed descriptions are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure, and do not constitute an improper limitation of the present disclosure.

DETAILED DESCRIPTION

In order to enable those skilled in the art to understand the technical solutions of the present disclosure, reference will be made clearly and completely technical solutions in the embodiments of the present disclosure with accompanying drawings.

It should be noted that terms "first" and "second" in the specification and claims of the present disclosure and the accompanying drawings are used to distinguish similar objects, rather than to describe a specific order or sequence. It should be understood that data used in such a manner may be interchanged under appropriate circumstances so that embodiments of the present disclosure described herein may be implemented in a sequence other than the sequence illustrated or described herein. The implementations described in the following exemplary embodiments do not represent all implementations consistent with the present disclosure; instead, the implementations described in the following exemplary embodiments are merely examples of an apparatus and method consistent with the attached claims and some aspects of the present disclosure.

In related arts, in the atmosphere of We Sing (a Karaoke software), multi-user chorus is currently not supported in the live broadcast room. The disclosure seeks to solve such problems in the related arts.

The method for processing multi-party audio provided in the disclosure can be applied to a live broadcast scene. An anchor refers to the current broadcaster which is equivalent to a host, who can actively invite users to connect to the microphone or approve the request of the current audience to connect to the microphone, or can disconnect the connection of a certain microphone. A virtual space interface is a page used to represent the virtual space displayed on a terminal. For example, in a live broadcast application scenario, the virtual space may refer to the live room where the host initiates the live broadcast, and the virtual space interface may refer to an interface of the live room.

Figure 1:
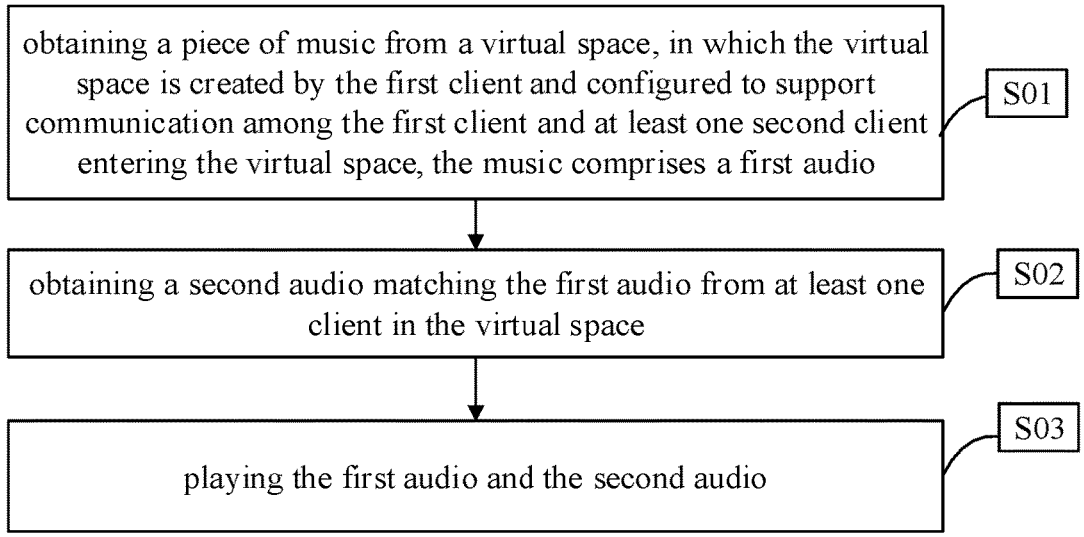
FIG. 1 illustrates a flowchart of a method for processing multi-party audio based on an embodiment of the disclosure.

FIG. 1 illustrates a flowchart of a method for processing multi-party audio based on an embodiment of the disclosure. The method is applied to a first client, and the first client may be a computer, a smart phone, etc. As shown in FIG. 1, the method includes the following steps.

In step 01, a piece of music is obtained from a virtual space, in which the virtual space is created by the first client and configured to support communication among the first client and at least one second client entering the virtual space, the music comprises a first audio.

In step 02, a second audio matching the first audio is obtained from at least one client in the virtual space.

In step 03, the first audio and the second audio are played.

The method of the disclosure will be further described in detail below.

Figure 2:
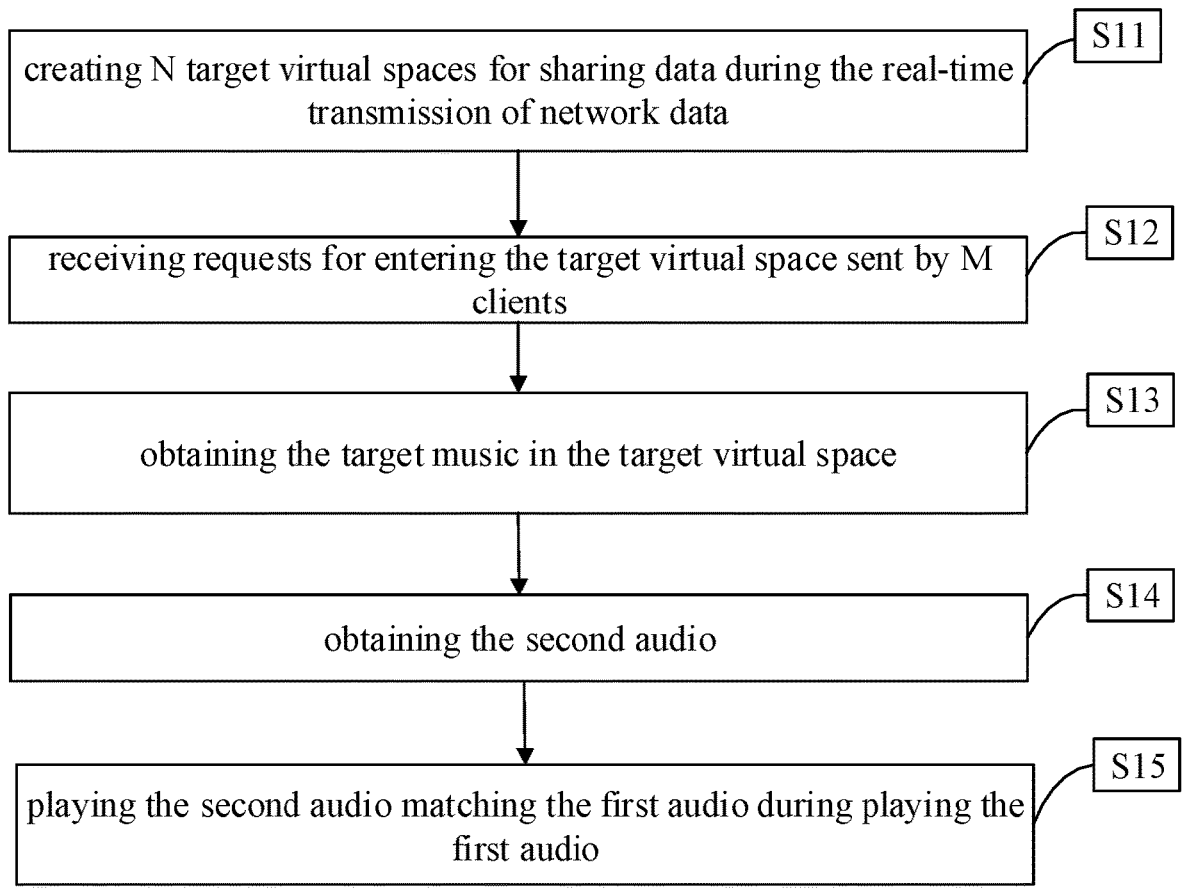
FIG. 2 illustrates a flowchart of a method for processing multi-party audio based on another embodiment of the disclosure.

FIG. 2 illustrates a flowchart of a method for processing multi-party audio based on an embodiment of the disclosure. The method is applied to a first client, and the first client may be a computer, a smart phone, etc. As shown in FIG. 2, the method includes the following steps.

In step S11, N target virtual spaces for sharing data are created during the real-time transmission of network data.

N is an integer greater than or equal to 1.

For example, when multiple client users want to sing in a live broadcast, a target virtual space is created, and each client enters the target virtual space to participate in the chorus. The target virtual space may be actively created by the live broadcast client (that is, the first client), or the client watching the live broadcast may send a request to the first client, and the first client creates the target virtual space based on the request.

In step S12, requests for entering the target virtual space sent by M clients are received.

The request is used to request to enter the target virtual space, and M is an integer greater than 0 and less than or equal to N−1. The M clients are second clients, and the first client and M second clients are chorus clients.

After the target virtual space is created, each second client who wants to participate in the chorus can request to enter the target virtual space. After entering the target virtual space, each second client requests the microphone to start recording the target song.

In step S13, the target music in the target virtual space is obtained.

The target music includes a first audio, and the first audio includes: the original singing and accompaniment of the target song. After obtaining the target music, the first client stores the music in local, and prompts each second client that has entered the target virtual space to obtain the target music locally.

Storing the target music to local of the first client and each second client allows those clients participating in the chorus loading the target music after accessing to the microphone, which can shorten the time spent in chorus connection between the chorus clients and shorten the delay.

In step S14, the second audio is obtained.

The second audio is an audio provided by W clients from the M clients and/or audio provided by the first client. W is an integer greater than 0 and less than or equal to M, and the second audio is an audio stream matching the first audio.

Segments in the target music may be assigned to the W second clients participating in the chorus and the first client in advance. Each client participating in the chorus records the assigned segments, and the first client collects the audio from itself and/or audio provided by W second clients, that is, the first client obtains the second audio. It should be noted that in the specific implementation process, the first client can also process the target music separately in the target virtual space. In this case, the second audio obtained by the first client only contains the audio provided by the first client. The first client may also not participate in the target music chorus. In this case, the second audio obtained by the first client only includes audio provided by W second clients.

The audio provided by the W clients can be obtained by the first client and other clients in the target virtual space. That is, during the target music processing process, W client users in the target virtual space can all hear the audio provided by each other.

Each client in the target virtual space can send audio via UDP (User Datagram Protocol). Encapsulation may be sent via UDP without establishing a connection, because there is no need to establish a connection, thereby saving time and improving the audio transmission efficiency and reducing the audio transmission time delay between the clients in each target virtual space.

In step S15, during a playing of the first audio, the second audio matching the first audio is correspondingly played.

The second audio matched with the first audio is played, and each client user watching the live broadcast can hear the target song of the chorus.

Clients that watch the live broadcast include: clients that watch the live broadcast and are not entering the target virtual space.

In embodiments of the disclosure, N target virtual spaces for resource sharing data are created during the real-time transmission of network data, requests for entering the target virtual space sent by M clients are received, the target music in the target virtual space is obtained, the second audio is obtained, the second audio matching the first audio is correspondingly played and during a playing of the first audio. With this method, multiple clients can participate in audio processing such as chorus in the target virtual space. In addition, in the embodiments of the present disclosure, each client participating in the audio processing obtains the target music locally, which can shorten the time for establishing connections between the various clients participating in the audio processing.

Figure 3:
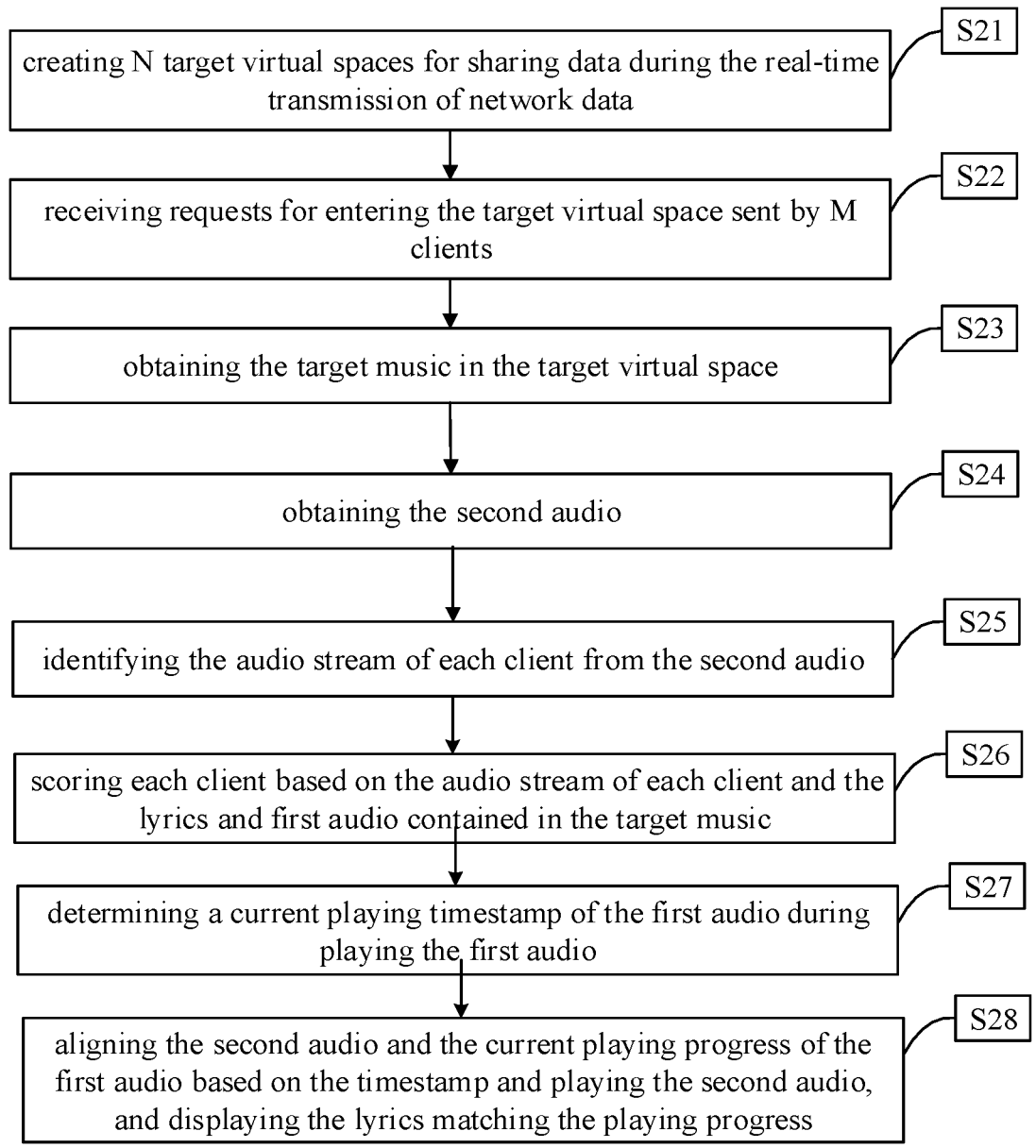
FIG. 3 illustrates a flowchart of a method for processing multi-party audio based on yet another embodiment of the disclosure.

FIG. 3 illustrates a flowchart of a method for processing multi-party audio based on another embodiment of the disclosure.

The method described in embodiments of the disclosure is applied to a first client. As shown in FIG. 3, the method includes the following steps.

In step S21, N target virtual spaces for resource sharing data are created during the real-time transmission of network data.

N is an integer greater than or equal to 1.

In some embodiments, for example, the first client and W second clients chorus a target song. In order to perform multi-party audio processing such as chorus, firstly, N target virtual spaces for resource sharing data need to be created, and secondly, all clients participating in the audio processing enter the target virtual space to process the target song.

In step S22, requests for entering the target virtual space sent by M clients are received.

The request is used to request to enter the target virtual space, and M is an integer greater than 0 and less than or equal to N−1.

The M clients include: W clients participating in processing the target music, and clients watching the W clients processing the target music. When the client enters the target virtual space, it may be ensured that the delay between the second client and the first client and other W clients participating in the chorus target music is sufficiently low.

In step S23, the target music in the target virtual space is obtained.

The target music includes a first audio and lyrics mating the first audio. The first client stores the target music in local, and prompts each second client that has entered the target virtual space to obtain the target music locally. The first audio may include, but is not limited to: the original singing, accompaniment, and chorus scoring specification file of the target song, etc.

In step S24, the second audio is obtained.

The second audio is an audio provided by W clients from the M clients and/or audio provided by the first client. W is an integer greater than 0 and less than or equal to M, and the second audio is an audio stream matching the first audio. In the process of multi-party audio processing, not only the first client obtains the audio provided by the W clients in the target virtual space, but each client in the target virtual space also obtains audio streams provided by other clients. When each client located in the target virtual space obtains audio streams provided by other clients, the sampling rate of the audio collected by the microphone can be increased, the sampling interval can be shortened, and the collection delay can be reduced.

In step S25, the audio stream of each client is identified from the second audio.

The clients may be W clients and/or the first client. The audio stream can carry a client ID, and a client can be uniquely calibrated through the carried ID.

In some embodiments, when identifying the audio stream of each client from the second audio, it is determined whether a preset parameter of the audio stream meets a preset condition for the audio stream output by each client. In a case that the preset parameter of the audio stream meets the preset condition, it is determined whether the audio stream contains voices of two or more users. In a case that the audio stream contains voices of two or more users, the audio stream composed of the audio signals corresponding to the user with the highest volume in the audio stream is determined as a valid audio stream. For the audio stream output by each client, in a case that the preset parameter of the audio stream does not meet the preset condition, it is determined that the audio is an invalid audio stream.

The method of selectively identifying the audio streams of each client from the second audio can accurately distinguish between valid audio streams and invalid audio streams output by each client, and facilitate subsequent processing of different types of audio streams. The valid audio stream output by the client can be used as the basic data for the subsequent scoring of the client.

In some embodiments, when determining whether the preset parameter of the audio stream meets the preset condition, it is determined whether an intensity of the audio stream is greater than the preset intensity; if yes, it is determined that the preset parameter of the audio stream meets the preset condition; if no, it is determined that the preset parameter of the audio does not meet the preset condition.

The preset intensity can be set by a person skilled in the art according to actual needs, which is not specifically limited in the embodiments of the disclosure. In a case that the intensity of the audio stream is greater than the preset intensity, it means that the client user is singing a song; otherwise, it means that the client user is not singing a song, the audio stream is determined to be an invalid audio stream.

In some embodiments, when determining whether the preset parameter of the audio stream meets the preset condition, it may be determined whether the intensity of the audio stream is greater than the preset intensity; in a case that the intensity of the audio stream is greater than the preset intensity, it may be determined whether the audio stream is noise; in a case that the audio stream is noise, it may be determined that the preset parameter of the audio stream does not meet the preset condition; otherwise (in a case that the audio stream is not noise), it may be determined that the preset parameter of the audio stream meets the preset condition.

In some embodiments, when identifying the audio stream of each client in the second audio, in a case that the voice contained in the audio streams of the two clients belong to the same user, although the received audio streams of the two clients are from two audio channels, the two audio streams can be timbre deduplicated to get an effective audio stream. For example, a client user participating in a chorus enters the target virtual space with two mobile phones at the same time, that is, different accounts participate in the chorus. The sounds contained in the audio stream belong to the same user.

In step S26, each client is scored based on the audio stream of each client and the lyrics and first audio contained in the target music.

In some embodiments, each client may be scored in following manner.

First, a preset scoring parameter in the audio stream is extracted for the audio stream of each client.

The preset scoring parameter may include, but are not limited to: pitch, rhythm, energy and other parameters.

Secondly, a target scoring parameter corresponding to the audio stream is extracted from the first audio and lyrics.

The target scoring parameter is the same as the parameter items included in the preset scoring parameter. For example, if the preset scoring parameter is pitch and rhythm, the target scoring parameter is also pitch and rhythm.

Finally, the preset scoring parameter is compared with the target scoring parameter; the score of the client is determined according to the comparison result.

For each client, the higher the match between the target score parameter corresponding to the audio stream output by the client and the preset score parameter, the higher the score of the client.

In the implementation process, it is not limited to scoring respective clients by the first client. The server can also score the respective clients based on the audio stream reported by the respective clients, or the respective clients store themselves and report the scores to the first client.

In step S27, during the playing of the first audio, a current playing timestamp of the first audio is determined.

The current playing progress of the first audio can be determined by the timestamp.

In step S28, the second audio and the current playing progress of the first audio are aligned and then played based on the timestamp, and the lyrics matching the playing progress are correspondingly displayed.

The audio stream output by each client in the target virtual space carries a timestamp, and the first audio and the second audio can be played after aligning the progress of the first audio and the second audio through the timestamp carried in the audio stream output by each client. The audio stream output by each client in the target virtual space can be obtained by other clients in the target virtual space in addition to being obtained by the first client. When each client outputs an audio stream, it can partially overlap the adjacent voice data packets to effectively combat network jitter; the guest client can transmit the video stream via UDP, which can improve the efficiency of audio stream transmission and shorten the transmission delay of audio stream between clients.

In some embodiments, each client whose score exceeds the preset score is determined after scoring each client, and the score of each client is displayed separately and a preset indicator (or, a logo) is added or set to the user avatar of the client with the score exceeding the preset score after the first audio is played.

For example, when the chorus of a song is completed, the score corresponding to each client participating in the chorus and the identification of each client are output, and the score is broadcast to all the clients watching the live broadcast in the live broadcast room, so that the client users watching the live broadcast can intuitively understand the singing level of each client user participating in the chorus. After displaying the score of each client, adding a preset logo to the avatar of the user whose score exceeds the preset score can increase the fun of chorus.

It should be noted that, the disclosure may determine each client whose score exceeds the preset score, add a preset indicator to the user avatar of each client whose score exceeds the preset score; or, the disclosure may determine the preset number of clients ranked first, and add a preset indicator to the user avatars of the preset number of clients ranked first.

In embodiments of the disclosure, N target virtual spaces for resource sharing data are created during the real-time transmission of network data, requests for entering the target virtual space sent by M clients are received, the target music in the target virtual space is obtained, the second audio is obtained, the second audio matching the first audio is correspondingly played and during a playing of the first audio, which can support multiple clients to participant in the chorus in the target virtual space. In addition, in embodiments of the disclosure, each client participating in the audio processing obtains the target music to local, which can shorten the time spent in chorus connection between the various clients participating in the audio processing. Further, each client in the target virtual space sends the audio stream through the user datagram protocol, which can improve the transmission efficiency of the audio stream and ensure the output of a coherent second audio. The first client also scores each client in the target virtual space, and displays the score of each client after the score is completed, which can enhance the fun of multi-party audio processing.

Figure 4:
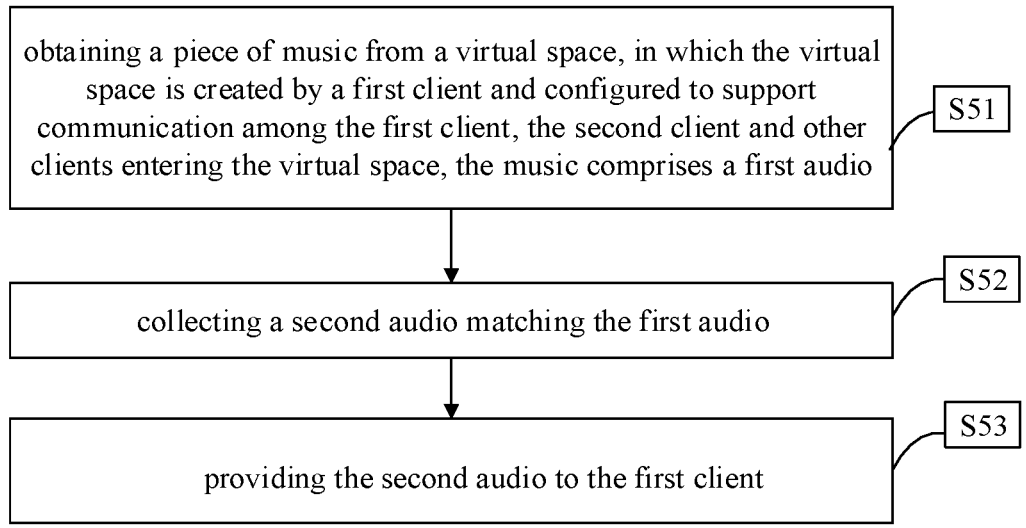
FIG. 4 illustrates a flowchart of a method for processing multi-party audio based on an embodiment of the disclosure.

FIG. 4 illustrates a flowchart of a method for processing multi-party audio based on an embodiment of the disclosure. Referring to FIG. 4, the method includes following steps.

At step S51, a piece of music is obtained from a virtual space, in which the virtual space is created by a first client and configured to support communication among the first client, the second client and other clients entering the virtual space, the music comprises a first audio.

At step S52, a second audio matching the first audio is collected.

At step S53, the second audio is provided to the first client.

The method of the disclosure will be further described in detail below.

Figure 5:
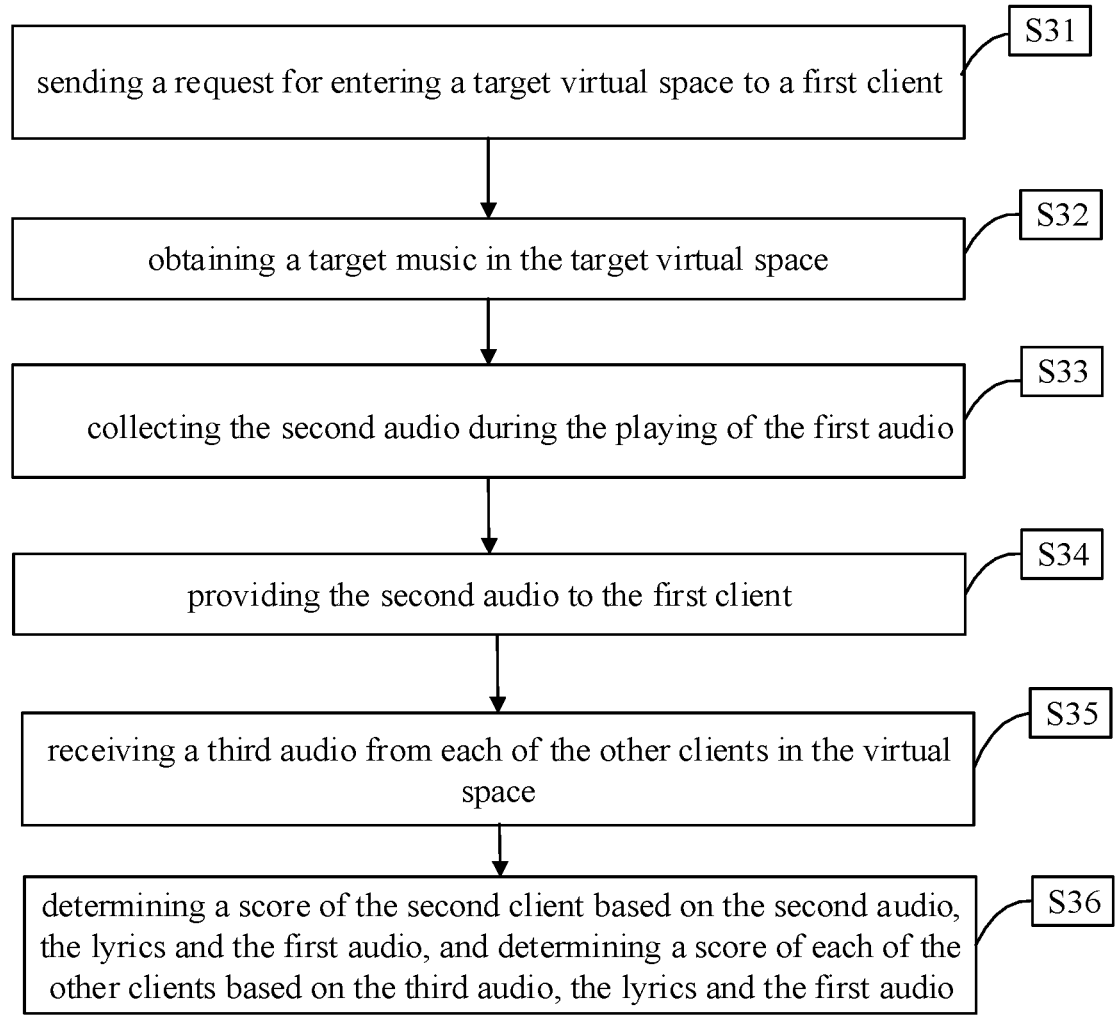
FIG. 5 illustrates a flowchart of a method for processing multi-party audio based on another embodiment of the disclosure.

FIG. 5 illustrates a flowchart of a method for processing multi-party audio based on another embodiment of the disclosure.

The method for processing multi-party audio shown in this embodiment is applied to the second client. As shown in FIG. 5, the method includes the following steps.

In step S31, a request for entering a target virtual space is sent to the first client.

The request is used to request to enter the target virtual space. In the process of real-time network data transmission, the first client creates N target virtual spaces for sharing data, in which N is an integer greater than or equal to 1. The target virtual space is a space provided by the first client and configured to process multi-party audio by the second clients. Each second client performs the same operation. In this embodiment, the method is described from the perspective of a single second client.

In step S32, a target music in the target virtual space is obtained.

The target music includes the first audio.

After entering the target virtual space, the second client may actively obtain the target music, or may obtain the target music according to the prompt of the first client.

In step S33, the second audio is collected during the playing of the first audio.

The second audio is an audio stream matching the first audio, and the second audio is an audio stream input by a user of the second client.

In step S34, the second audio is provided to the first client.

The second client sends the second audio to the server, and the server sends the second audio to the first client.

In some embodiments, the second audio is provided to each client in the target virtual space, and each client in the target virtual space includes: a first client and a plurality of second clients. The second audio is provided to each client in the target virtual space, so that each client can play the audio to the user in time and ensure the timeliness of audio transmission. The client user who receives the second audio can perform audio connection in time.

In step S35, a third audio from each of the other clients in the virtual space is received.

In detail, the second audio sent by the first client and each client in the target virtual space is received. In some embodiments, the audio generated by clients and matching the first audio are called as the second audio. The second audio and the third audio are actually in the same meaning, but only used to distinguish the audio collected by the discussed second client in the embodiment of FIG. 5 and audios received from other second client.

In the process of multi-party audio processing, the second client not only obtains the audio input by the local user, but also receives the second audio sent by each client participating in the audio processing in the target virtual space, thereby ensuring that the processed audio can be output in a timely and complete manner.

In step S36, a score of the second client is determined based on the second audio, the lyrics and the first audio, and a score of each of the other clients is determined based on the third audio, the lyrics and the first audio.

The specific manner of the second client scoring other clients and the first client refers to the related description of the first client scoring the respective clients, which will not be repeated in this embodiment.

In some embodiments, the second client provides the scores to the first client and/or each client in the target virtual space.

Providing the scores to each client in the target virtual space allows each client user can understand the singing level of each user participating in this multi-party audio processing, and it can also improve the interaction between the client users.

Step 35 and step S36 are optional steps. In the implementation process, the second client does not need to perform these two steps, and only provides the second audio to the first client, and the first client outputs the second audios provided by the respective second clients, and determines a score for each second client.

In embodiments of the disclosure, during the real-time transmission of network data, the first client creates N target virtual spaces for sharing data, the second client sends a request for entering the virtual space to the first client, the second client obtains the target music in the target virtual space, and during the playing of the first audio, the second audio is collected, the second audio is provided to the first client, and the second audio is output through the first client. Thus, the second client and the first client can jointly participate in audio processing such as chorus in the target virtual space. In addition, in the embodiments of the present disclosure, each client participating in the audio processing obtains the target music locally, which can shorten the time spent in chorus connection between the various clients participating in the audio processing.

Figure 6:
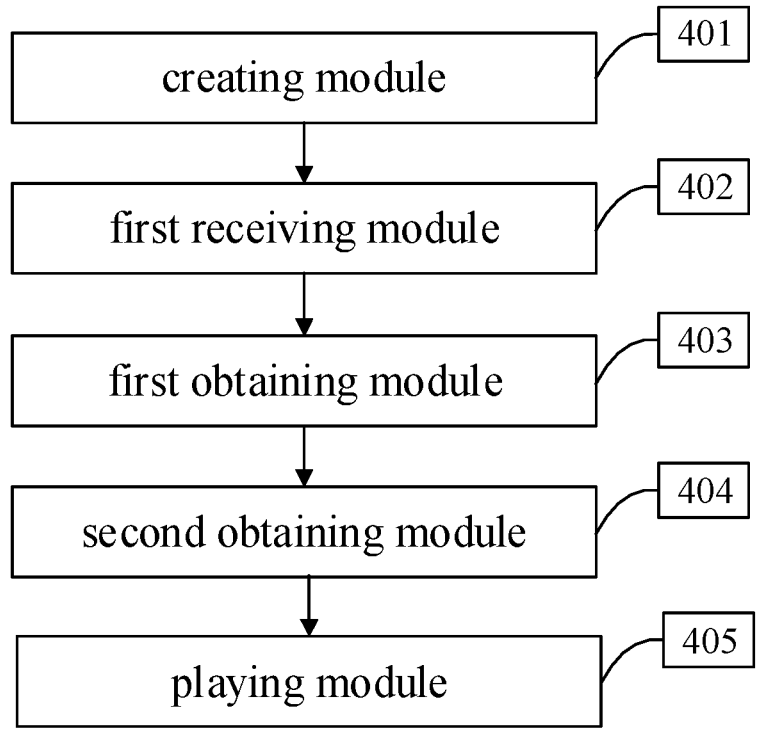
FIG. 6 illustrates a block diagram of an apparatus for processing multi-party audio based on an embodiment of the disclosure.

FIG. 6 illustrates a block diagram of an apparatus for processing multi-party audio based on an embodiment of the disclosure. The apparatus includes a creating module 401, a first receiving module 402, a first obtaining module 403, a second obtaining module 404, and a playing module 405. The device is set in the first client.

The creating module 401 is configured to create N target virtual spaces for resource sharing data during the real-time transmission of network data. N is an integer greater than or equal to 1.

The first receiving module 402 is configured to receive requests for entering the target virtual space sent by M clients, and M is an integer greater than 0 and less than or equal to N−1.

The first obtaining module 403 is configured to obtain the target music in the target virtual space. The target music includes a first audio.

The second obtaining module 404 is configured to obtain a second audio. The second audio is an audio provided by W clients from the M clients and/or audio provided by the first client. W is an integer greater than 0 and less than or equal to M, and the second audio is an audio stream matching the first audio.

The playing module 405 is configured to play the second audio matching the first audio during a playing of the first audio.

In some embodiments, the target music further includes: lyrics matching the first audio; the playing module includes: a timestamp determining sub-module and an alignment sub-module.

The timestamp determining sub-module is configured to determine the current playing timestamp of the first audio during the playing of the first audio;

The alignment sub-module is configured to align the second audio and the current playing progress of the first audio based on the timestamp, and to display the lyrics corresponding to the playing progress.

In some embodiments, the apparatus also includes a first identification module and a first scoring module.

The first identification module is configured to identify the audio stream of each client from the second audio after the second obtaining module obtains the second audio, the client may be W clients and/or the first client.

The first scoring module is configured to determine a score of each client based on the audio stream of each client and the lyrics and first audio contained in the target music.

In some embodiments, the first scoring module includes a first extraction sub-module, a second extraction sub-module, a comparison sub-module and a score determination sub-module.

The first extraction submodule is configured to extract a preset scoring parameter in the audio stream for audio stream of each client.

The second extraction sub-module is configured to extract a target scoring parameter corresponding to the audio stream from the first audio and lyrics.

The comparison sub-module is configured to compare the preset score parameter with the target score parameter.

The score determination sub-module is configured to determine the score of the client according to the comparison result.

In some embodiments, the apparatus also includes: a first determining module and an indicator adding module.

The first determining module is configured to determine a client with a score exceeding a preset score after the first scoring module scores each client based on the audio stream of each client and the lyrics and first audio contained in the target music.

The indicator adding module is configured to display the scores of the chorus clients separately after the first audio playing is completed, and to add a preset indicator to the user avatar of the client whose score exceeds the preset score.

In some embodiments, the first identification module includes followings.

The first judging sub-module is configured to judge whether a preset parameter of the audio stream meet a preset condition for the audio stream output by each client.

The second judging sub-module is configured to judge whether the audio stream contains voices of two or more users when the preset condition is met.

The valid audio stream determining sub-module is configured to determine the audio stream composed of the audio signals corresponding to the user with the highest volume in the audio stream as the valid audio stream in response to the audio stream containing voices of two or more users.

The specific manner of performing operations by each module of the apparatus in the foregoing embodiment has been described in detail in the embodiment of the method, and detailed description will not be given here.

Figure 7:
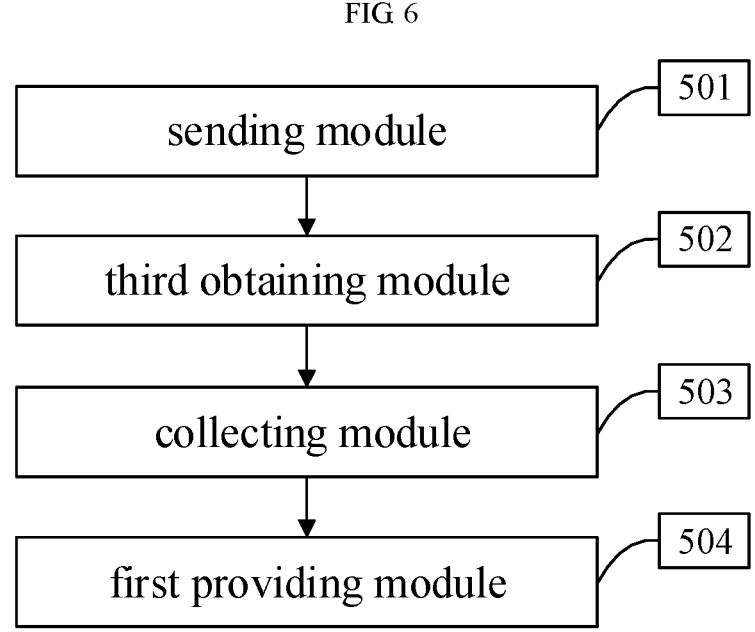
FIG. 7 illustrates a block diagram of an apparatus for processing multi-party audio based on an embodiment of the disclosure.

FIG. 7 illustrates a block diagram of an apparatus for processing multi-party audio based on another embodiment of the disclosure. the apparatus includes a sending module 501, a third obtaining module 502, a collecting module 503, and a first providing module 504. The apparatus is set in a second client.

The sending module 501 is configured to send a request for entering a target virtual space to the first client. In the process of real-time network data transmission, the first client creates N target virtual spaces for sharing data, in which N is an integer greater than or equal to 1.

The third obtaining module 502 is configured to obtain a target music in the target virtual space.

The collection module 503 is configured to collect the second audio during the playing of the first audio. The second audio is an audio stream matching the first audio.

The first providing module 504 is configured to provide the second audio to the first client.

In some embodiments, the providing module is configured to provide the second audio to each client in the target virtual space.

In some embodiments, the apparatus also includes followings.

The second receiving module is configured to receive third audio from each of the other clients in the virtual space.

The second scoring module is configured to determine a score of the second client based on the second audio, the lyrics and the first audio, and to determine a score of each of the other clients based on the third audio, the lyrics and the first audio.

In some embodiments, the apparatus also includes followings.

The second providing module is configured to provide the scores to the first client and/or each client in the target virtual space after determining the scores.

The specific manner of performing operations by each module of the apparatus in the foregoing embodiment has been described in detail in the embodiment of the method, and detailed description will not be given here.

Figure 8:
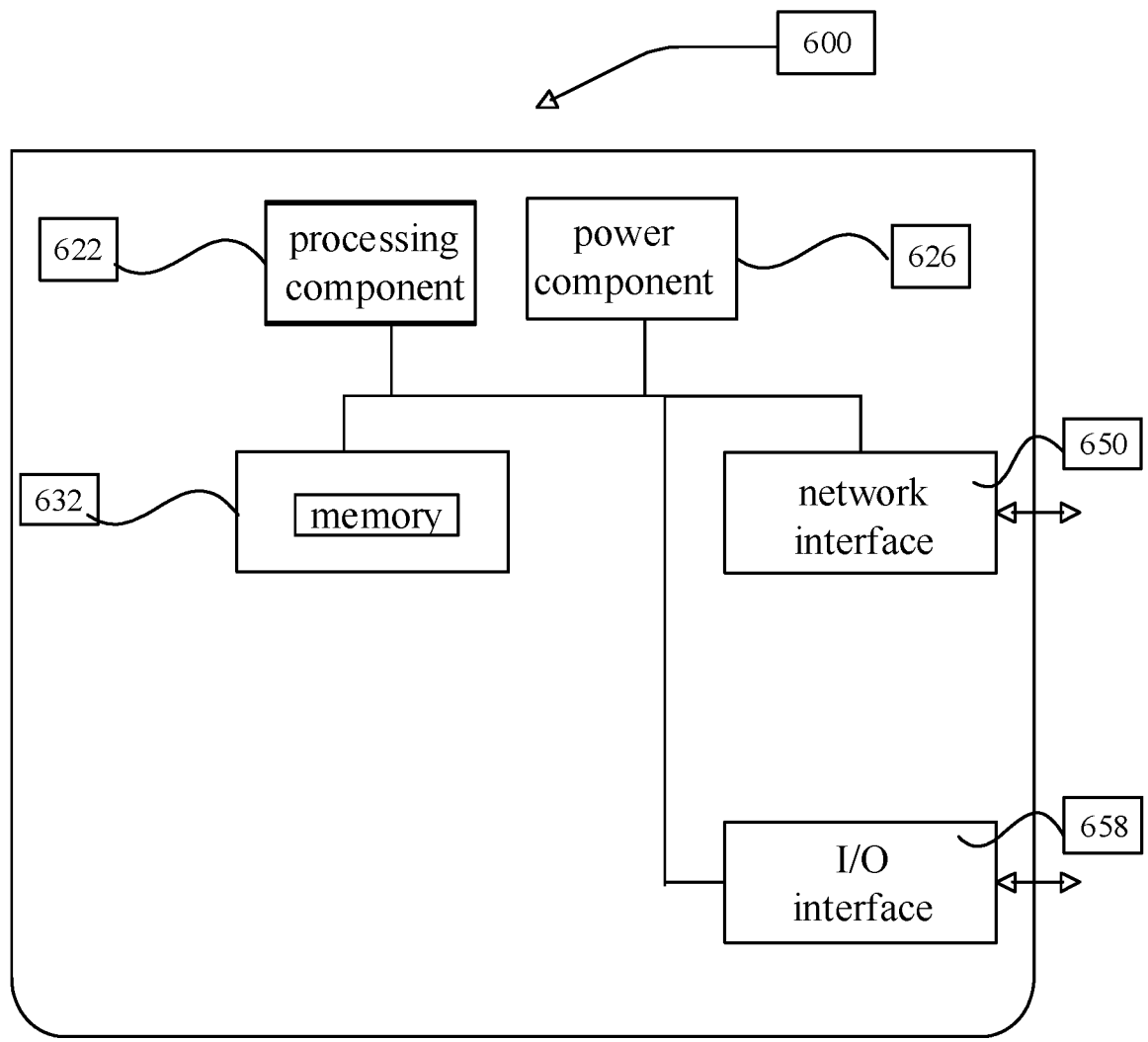
FIG. 8 illustrates a structure diagram of a device based on an embodiment of the disclosure.

FIG. 8 illustrates a structure diagram of an electronic device based on an embodiment of the disclosure. For example, the electronic device 600 may be provided as a client device.

Referring to FIG. 8, the electronic device 600 includes a processing component 622, which further includes one or more processors, and a memory resource represented by a memory 632 for storing instructions that can be executed by the processing component 622, such as application programs. The application program stored in the memory 632 may include one or more modules each corresponding to a set of instructions. In addition, the processing component 622 is configured to execute instructions to execute any one of the methods described above.

The electronic device 600 may also include a power component 626 configured to perform power management of the electronic device 600, a wired or wireless network interface 650 configured to connect the electronic device 600 to a network, and an input output (I/O) interface 658. The electronic device 600 can operate based on an operating system stored in the memory 632, such as Windows Server™, Mac OS X™, Unix™, Linux™, FreeBSD™ or the like.

In an exemplary embodiment, there is also provided a storage medium including instructions, such as a memory including instructions, which may be executed by a processor of a resource packaging device to implement any of the foregoing methods. Alternatively, the storage medium may be a non-transitory computer-readable storage medium, for example, the non-transitory computer-readable storage medium may be ROM, random access memory (RAM), CD-ROM, magnetic tape, floppy disk, and optical data storage Equipment etc.

In an exemplary embodiment, a computer program product is also provided. The computer program product includes readable program code. The readable program code can be executed by a processor of a multi-party audio processing device to complete any of the above methods. Optionally, the program code may be stored in the storage medium of the resource packaging device. The storage medium may be a non-transitory computer-readable storage medium. For example, the non-transitory computer-readable storage medium may be a ROM, a random access Memory (RAM), CD-ROM, magnetic tape, floppy disk and optical data storage device, etc.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

Those skilled in the art will easily achieve other embodiments of the disclosure after considering the description and practicing the invention disclosed herein. The disclosure is intended to cover any variations, uses, or adaptive changes of the disclosure. These variations, uses, or adaptive changes follow the general principles of the disclosure and include common knowledge or conventional technical means in the technical field not disclosed in the disclosure. The description and the embodiments are only regarded as exemplary, and the true scope and spirit of the disclosure are pointed out by the following claims.

It should be understood that the disclosure is not limited to the precise structure that has been described above and shown in the drawings, and various modifications and changes can be made without departing from its scope. The scope of the disclosure is only limited by the appended claims.

What is claimed is:

1. A method for processing multi-party audio, applied to a first client and comprising:
obtaining a piece of music from a virtual space, wherein the virtual space is created by the first client and configured to support communication among the first client and at least one second client entering the virtual space, the music comprises a first audio;

obtaining, from at least one client in the virtual space, a second audio matching the first audio; and playing the first audio and the second audio, wherein the music further comprises lyrics matching the first audio, and the method further comprises:

for each client in the second audio, identifying an audio stream of the client;

determining a score of the client based on the audio stream, the first audio and the lyrics; and displaying the score of the client, and setting an indicator on an avatar of a client with a score exceeding a score threshold.

2. The method of claim 1, wherein said identifying the audio stream of the client comprises:

identifying the audio stream based on an identifier of the client carried in the audio stream.

3. The method of claim 1, wherein said identifying the audio stream of the client further comprises:

determining whether a parameter of the audio stream meets a preset condition;

determining whether the audio stream contains voices of two or more users in response to the parameter meeting the preset condition; and determining an audio stream composed of audio signals corresponding to a user with the highest volume in the audio stream as a valid audio stream in response to the audio stream containing the voices of two or more users.

4. The method of claim 1, wherein determining the score of the client comprises:

extracting a first scoring parameter in the audio stream;

extracting, from the first audio and the lyrics, a second scoring parameter corresponding to the audio stream;

comparing the first scoring parameter with the second scoring parameter; and determining the score of the client based on a comparison result.

5. The method of claim 1, wherein the music further comprises lyrics matching the first audio; and said playing the first audio and the second audio comprises:

determining a playing timestamp of the first audio;

aligning the second audio with a playing progress of the first audio based on the playing timestamp, and displaying the lyrics matching the playing progress.

6. A method for processing multi-party audio, applied to a second client and comprising:

obtaining a piece of music from a virtual space, wherein the virtual space is created by a first client and configured to support communication among the first client, the second client and other clients entering the virtual space, the music comprises a first audio;

collecting a second audio matching the first audio; and providing the second audio to the first client, so as to cause the first client to identify an audio stream of each client in the second audio, to determine a score of the client based on the audio stream, the first audio and lyrics matching the first audio in the music, to display the score of the client, and to set an indicator on an avatar of a client with a score exceeding a score threshold.

7. The method of claim 6, further comprising:

providing the second audio to each of the other clients in the virtual space.

8. The method of claim 6, further comprising:

receiving a third audio from each of the other clients.

9. The method of claim 8, wherein the music further comprises lyrics matching the first audio, and the method further comprises:

determining a score of the second client based on the second audio, the lyrics and the first audio; and determining a score of each of the other clients based on the third audio, the lyrics and the first audio.

10. The method of claim 9, further comprising:

providing the scores to each client in the virtual space.

11. An apparatus for processing multi-party audio, applied to a first client and comprising:

one or more processors;

a memory coupled to the one or more processors, a plurality of instructions stored in the memory, when executed by the one or more processors, causing the one or more processors to perform acts of:

obtaining a piece of music from a virtual space, wherein the virtual space is created by the first client and configured to support communication among the first client and at least one second client entering the virtual space, the music comprises a first audio;

obtaining, from at least one client in the virtual space, a second audio matching the first audio; and playing the first audio and the second audio, wherein the music further comprises lyrics matching the first audio, and the one or more processors are further caused to configured to perform acts of:

for each client in the second audio, identifying an audio stream of the client;

determining a score of the client based on the audio stream, the first audio and the lyrics; and displaying the score of the client, and setting an indicator on an avatar of a client with a score exceeding a score threshold.

12. The apparatus of claim 11, wherein said identifying the audio stream of the client comprises:

identifying the audio stream based on an identifier of the client carried in the audio stream.

13. The apparatus of claim 11, wherein said identifying the audio stream of the client further comprises:

determining whether a parameter of the audio stream meets a preset condition;

determining whether the audio stream contains voices of two or more users in response to the parameter meeting the preset condition; and determining an audio stream composed of audio signals corresponding to a user with the highest volume in the audio stream as a valid audio stream in response to the audio stream containing the voices of two or more users.

14. The apparatus of claim 11, wherein said determining the score of the client comprises:

extracting a first scoring parameter in the audio stream;

extracting, from the first audio and the lyrics, a second scoring parameter corresponding to the audio stream;

comparing the first scoring parameter with the second scoring parameter; and determining the score of the client based on a comparison result.

15. The apparatus of claim 11, wherein the music further comprises lyrics matching the first audio; and said playing the first audio and the second audio comprises:

determining a playing timestamp of the first audio;

aligning the second audio with a playing progress of the first audio based on the playing timestamp, and displaying the lyrics matching the playing progress.

16. A non-transitory computer-readable storage medium, applied to a first client, wherein when an instruction stored therein is executed by a processor in an electronic device, the processor is caused to perform acts comprising:
- obtaining a piece of music from a virtual space, wherein the virtual space is created by the first client and configured to support communication among the first client and at least one second client entering the virtual space, the music comprises a first audio;
- obtaining, from at least one client in the virtual space, a second audio matching the first audio; and
- playing the first audio and the second audio,
- wherein the music further comprises lyrics matching the first audio, and the processor is further caused to perform acts comprising:
- for each client in the second audio, identifying an audio stream of the client;
- determining a score of the client based on the audio stream, the first audio and the lyrics;
- and displaying the score of the client, and setting an indicator on an avatar of a client with a score exceeding a score threshold.

\* \* \* \* \*